(12) United States Patent
Kamada (10) Patent No.: US 8,065,549 B2
(45) Date of Patent: Nov. 22, 2011

(54) SCAN-BASED INTEGRATED CIRCUIT HAVING CLOCK FREQUENCY DIVIDER

(75) Inventor: Tetsuo Kamada, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1048 days.

(21) Appl. No.: 11/937,062

(22) Filed: Nov. 8, 2007

(65) Prior Publication Data

US 2008/0115005 A1 May 15, 2008

(30) Foreign Application Priority Data

Nov. 9, 2006 (JP) ................................. 2006-304448

(51) Int. Cl.
*G06F 1/12* (2006.01)
(52) U.S. Cl. ........................ 713/400; 713/501; 714/731
(58) Field of Classification Search ................ 713/400, 713/501; 714/731
See application file for complete search history.

(56) References Cited

U.S. PATENT DOCUMENTS

| | | | |
|---|---|---|---|
| 6,442,722 B1 * | 8/2002 | Nadeau-Dostie et al. | 714/731 |
| 6,510,534 B1 | 1/2003 | Dostie et al. | |
| 6,966,021 B2 * | 11/2005 | Rajski et al. | 714/726 |
| 7,155,651 B2 * | 12/2006 | Nadeau-Dostie et al. | 714/731 |
| 7,194,669 B2 * | 3/2007 | Nadeau-Dostie | 714/726 |
| 7,710,801 B2 * | 5/2010 | Li | 365/201 |
| 2002/0120896 A1 * | 8/2002 | Wang et al. | 714/731 |
| 2003/0084390 A1 * | 5/2003 | Tamarapalli et al. | 714/744 |

FOREIGN PATENT DOCUMENTS

JP 2002-124852 4/2002

* cited by examiner

*Primary Examiner* — Chun Cao
(74) *Attorney, Agent, or Firm* — Turocy & Watson, LLP (57) ABSTRACT

An integrated circuit includes a clock generator and a synchronous clock circuit unit. The clock generator generates a first clock signal, a second clock signal, and a third clock signal, which are synchronized with one another and are provided with mutually different frequencies. The synchronous clock circuit unit includes synchronous clock circuits to which the first clock signal, the second clock signal, and the third clock signal are inputted, respectively. The synchronous clock circuits are scanned by use of the first clock signal, the second clock signal, and the third clock signal.

14 Claims, 8 Drawing Sheets

| DIVIDED CLOCK SIGNAL | |
|---|---|
| CLK11 | $n \times f$ |
| ⋮ | ⋮ |
| CLKkk | $f$ |
| ⋮ | ⋮ |
| CLKmm | $f/n$ |

Fig. 4A

| | SCAN SHIFT MODE | LAUNCH/CAPTURE MODE |
|---|---|---|
| CLK1 | $f$ | $n \times f$ |
| ⋮ | ⋮ | ⋮ |
| CLKk | $f$ | $f$ |
| ⋮ | ⋮ | ⋮ |
| CLKm | $f$ | $f/n$ |

SCAN-BASED INTEGRATED CIRCUIT HAVING CLOCK FREQUENCY DIVIDER

CROSS REFERENCE TO RELATED APPLICATION

This application is based upon and claims the benefit of priority from the prior Japanese Patent Application No. P2006-304448, filed on Nov. 9, 2006; the entire contents of which are incorporated herein by reference.

FIELD OF THE INVENTION

The present invention relates to a scan-based integrated circuit including a clock frequency divider to perform a scan test for an integrated circuit.

BACKGROUND OF THE INVENTION

Along the progress in higher and multiple performances of an information equipment and the like in recent years, a system LSI, a SoC and other devices are widely used in portable information equipment, personal computers and so forth. The system LSI is configured to integrate multiple system functions on a single chip. The SoC is configured to integrate a memory, a logic circuit, and an analog circuit into a single chip. Such a system LSI or a SoC, which is designed in a large scale and configured to operate at a high speed, uses techniques called DFT (design for testability) such as scan test method or a BIST (built-in self test) method, in order to suppress testing costs, for example. Japanese Patent Application Laid-open Publication No. 2002-124852 discloses the scan test method. In the scan test method, a flip-flop is replaced by a scan flip-flop. It is possible to give scan-in data from outside the system LSI or the SoC and to read the test values through an external input-output terminal by using the scan flip-flop. Accordingly, it is easier to produce a test pattern using an ATPG (automatic test pattern generator).

In the above-mentioned scan test method, when a scan test is performed for a logic circuit unit including a clock frequency divider to which clock signals are to be inputted, a multiplexer is provided on an output end of the clock frequency divider. A delay test using a multiplexer for selecting a clock signal or a divided clock signal has a problem that generation of a scan pattern becomes extremely inefficient which depends on an operating frequency. Moreover, the delay test has another problem that timing adjustment is difficult to make due to a skew between the clock signal and the divided clock signal.

SUMMARY OF THE INVENTION

According to an aspect of the invention is provide a scan-based integrated circuit comprising a clock generator to generate a plurality of clock signals by use of a reference clock signal and a synchronous clock circuit unit including a plurality of synchronous clock circuits constituting a scan chain to be scanned by the clock signals, wherein a phase relationship of the clock signals is set up by use of the reference clock signal just after a scan shift mode is transferred to a launch and capture mode by a scan shift signal while maintaining states of scan nodes of the synchronous clock circuits, so that the clock signals are synchronizes with one another in the scan shift mode and the launch and capture mode.

According to another aspect of the invention is provide a scan-based integrated circuit comprising a clock generator including a clock frequency divider to generate a plurality of divided clock signals having different frequencies by use of a reference clock signal, the clock generator further including a clock gating circuit to generate a plurality of clock signals by use of the divided clock signals and the reference clock signal and a synchronous clock circuit unit including a plurality of synchronous clock circuits constituting a scan chain to be scanned by the clock signals, wherein a phase relationship of the clock signals is set up by use of the reference clock signal just after a scan shift mode is transferred to a launch and capture mode by a scan shift signal while maintaining states of scan nodes of the synchronous clock circuits, so that the clock signals are synchronizes with one another in the scan shift mode and the launch and capture mode.

According to another aspect of the invention is provide a scan-based integrated circuit comprising a clock generator including a clock frequency divider to generate a divided clock signal divided a frequency of a reference clock signal into a value of n divided by m, the clock generator further including a clock gating circuit to generate a clock signal by use of the divided clock signal and the reference clock signal and a synchronous clock circuit unit including a plurality of synchronous clock circuits constituting a scan chain to be scanned by the reference clock signal and the clock signal, wherein n and m are positive integers, a value of n is larger than a value of m, a phase relationship of the clock signal is set up by use of the reference clock signal just after a scan shift mode is transferred to a launch and capture mode by a scan shift signal while maintaining states of scan nodes of the synchronous clock circuits, so that the reference clock signal and the clock signal are synchronizes with one another in the scan shift mode and the launch and capture mode.

According to another aspect of the invention is provide a scan-based integrated circuit comprising a clock generator including a clock frequency divider to generate a plurality of divided clock signals having different frequencies by use of a reference clock signal and a scan shift signal, the clock generator further including a clock gating circuit to generate a plurality of clock signals by use of the divided clock signals, the reference clock signal and the scan shift signal and a synchronous clock circuit unit including a plurality of synchronous clock circuits constituting a scan chain to be scanned by the reference clock signal and the clock signals, wherein a phase relationship of the clock signals is set up by use of the reference clock signal just after a scan shift mode is transferred to a launch and capture mode by a scan shift signal while maintaining states of scan nodes of the synchronous clock circuits, so that the clock signals are synchronizes with one another in the scan shift mode and the launch and capture mode.

DETAILED DESCRIPTION OF THE INVENTION

Embodiments of the present invention will be described with reference to the accompanying drawings.

Figure 1:
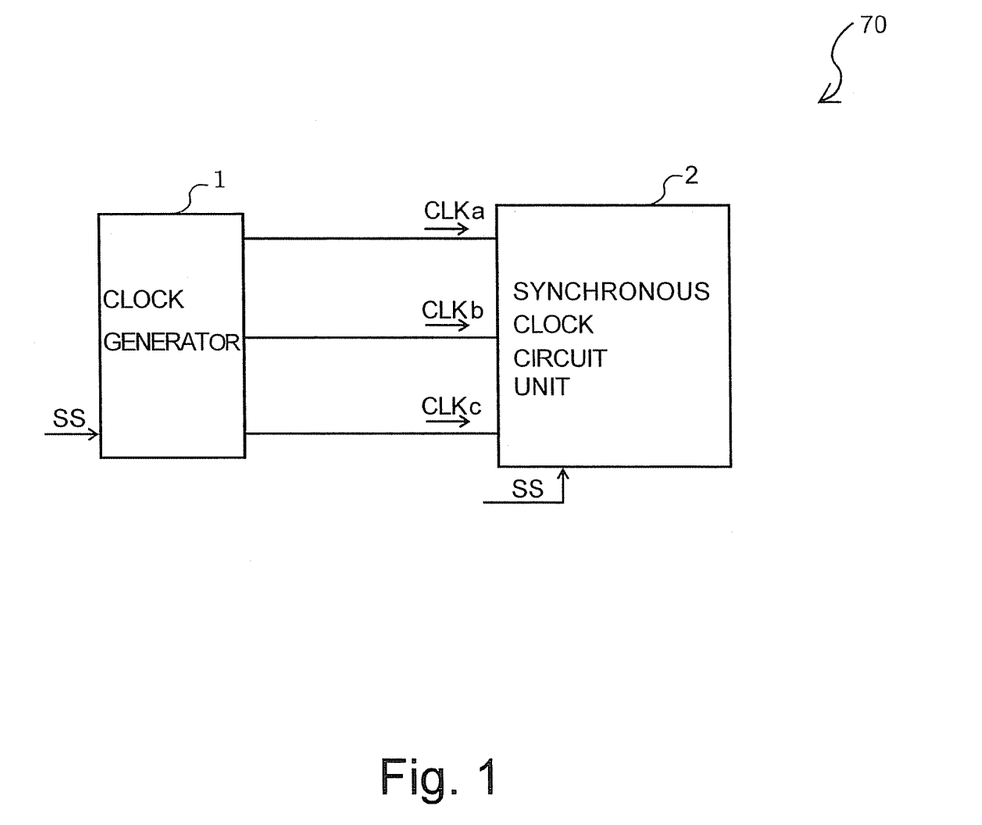
FIG. 1 is a block diagram showing an integrated circuit serving as a system LSI according to a first embodiment of the present invention.
Figure 2:
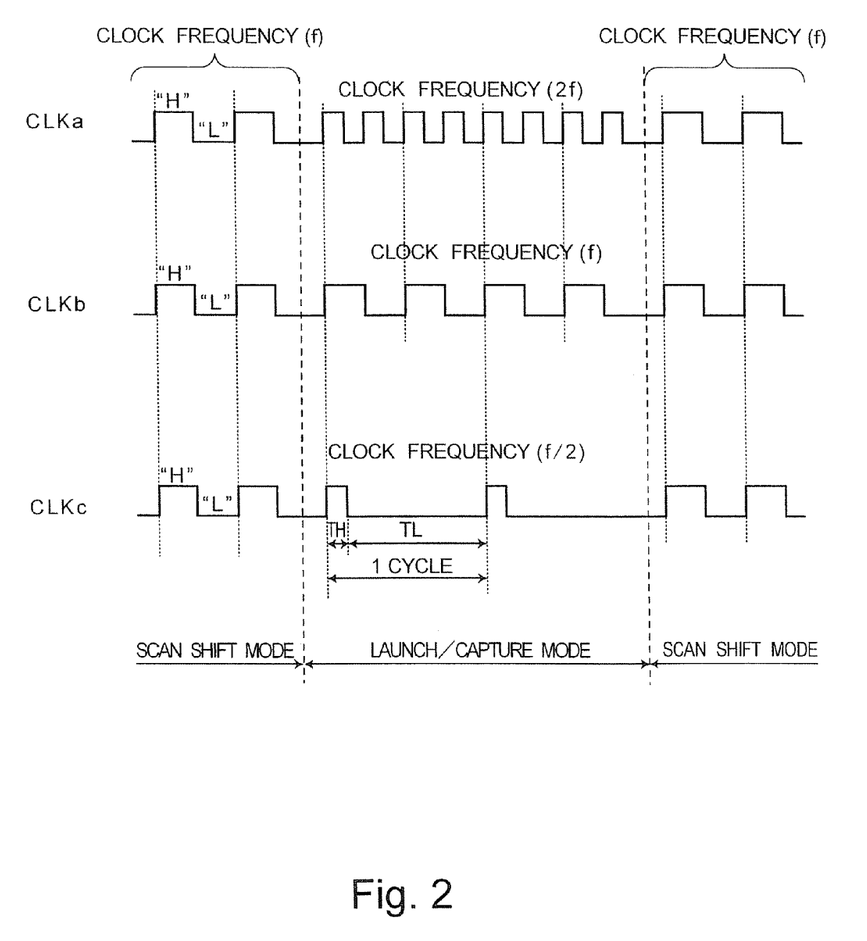
FIG. 2 is a diagram showing waveforms of clock signals outputted from a clock generator according to the first embodiment of the present invention.

An integrated circuit according to a first embodiment of the present invention will be described with reference to the accompanying drawings. FIG. 1 is a block diagram showing an integrated circuit serving as a system LSI, and FIG. 2 is a diagram showing waveforms of clock signals outputted from a clock generator of the integrated circuit. In this embodiment, multiple clock signals are to be outputted from the clock generator.

As shown in FIG. 1, an integrated circuit 70 includes a clock generator 1 and a synchronous clock circuit unit 2. The integrated circuit 70 is a scan-based integrated circuit. A scan shift signal SS is inputted to the clock generator 1, and the clock generator 1 generates a clock signal CLKa, a clock signal CLKb, and a clock signal CLKc based on a reference clock signal and a control signal for controlling the clock signals which are generated therein. The clock signal CLKa, the clock signal CLKb, and the clock signal CLKc are synchronous clock signals which are synchronized with one another. Here, the reference clock signal and the control signal for controlling the clock signals are generated inside the clock generator 1. Instead, the reference clock signal and the control signal may be supplied from outside.

The scan shift signal SS as well as the clock signal CLKa, the clock signal CLKb, and the clock signal CLKc outputted from the clock generator 1 are inputted to the synchronous clock circuit unit 2. The synchronous clock circuit unit 2 includes synchronous clock circuits to be scanned by any of the clock signal CLKa, the clock signal CLKb, and the clock signal CLKc, such as a SFF (scan flip-flop) designed for scanning. The synchronous clock circuits to be scanned constitute a scan chain and are subjected to a scan test.

As shown in FIG. 2, the clock signal CLKa, the clock signal CLKb, and the clock signal CLKc outputted from the clock generator 1 are respectively provided with a clock frequency (f) in a scan shift mode, synchronized with one another, and provided with waveforms in the same phase.

In a "launch and capture mode" between a "scan shift mode" and another "scan shift mode", the clock signal CLKa has a clock frequency (2f) which is twice as high as the clock frequency (f). Meanwhile, the clock signal CLKb has the clock frequency (f), and the clock signal CLKc has a clock frequency (f/2) which is a half as high as the clock frequency (f). The clock signal CLKa, the clock signal CLKb, and the clock signal CLKc are synchronized with one another in the "launch and capture mode".

The synchronous clock circuit unit 2 starts setting up a phase relationship of the clock signal CLKa, the clock signal CLKb, and the clock signal CLKc just after the "scan shift mode" is transferred to the "launch and capture mode" while maintaining all states of scan nodes (such as 1 or 0 (zero)) and retaining the SFF state, for example. Accordingly, it is possible to start the phase relationship of the clock signal CLKa, the clock signal CLKb, and the clock signal CLKc in a definitive state.

For example, an initial rising clock of the clock signal CLKa, the clock signal CLKb, and the clock signal CLKc transferred from the "scan shift mode" to the "launch and capture mode" becomes a first launch clock. Meanwhile, an initial rising clock of the clock signal CLKa, the clock signal CLKb, and the clock signal CLKc just before the "launch and capture mode" is transferred to the "scan shift mode" becomes a last launch clock. The scan shift signal SS selects either the "scan shift mode" or the "launch and capture mode".

Here, the signals are synchronized with one another by use of rising edges. Instead, the signals may be synchronized with one another by use of falling edges thereof. A duty ratio of the clock signal CLKc in the "launch and capture mode" is set to 12.5% for a "high" level period TH relative to 87.5% for a "low" level period TL (the duty ratio of 12.5% to 87.5%). However, the duty ratio may be arbitrarily changed without limitation to the foregoing.

As described above, the integrated circuit of this embodiment includes the clock generator 1 and the synchronous clock circuit unit 2. The clock generator 1 generates the clock signal CLKa, the clock signal CLKb, and the clock signal CLKc which are synchronized with one another. In the "scan shift mode", the clock signal CLKa, the clock signal CLKb, and the clock signal CLKc are respectively provided with the clock frequency (f), synchronized with one another, and provided with the waveforms in the same phase. In the "launch and capture mode", the clock signal CLKa has the clock frequency (2f), the clock signal CLKb has the clock frequency (f), and the clock signal CLKc has the clock frequency (f/2). The clock signal CLKa, the clock signal CLKb, and the clock signal CLKc in the "launch and capture mode" are synchronized with one another.

Accordingly, it is possible to start the phase relationship of the clock signal CLKa, the clock signal CLKb, and the clock signal CLKc in the definitive state just after the "scan shift mode" is transferred to the "launch and capture mode" while maintaining all the states of scan nodes and retaining the states of the synchronous clock circuits in the synchronous clock circuit unit 2. Therefore, it is possible to avoid occurrence of a skew among the clock signal CLKa, the clock signal CLKb, and the clock signal CLKc outputted from the clock generator 1.

Although three types of synchronized clock signals are outputted from the clock generator 1 in this embodiment, it is possible to output n types (where n is 2 or an integer equal to or greater than 4) instead.

Figure 3:
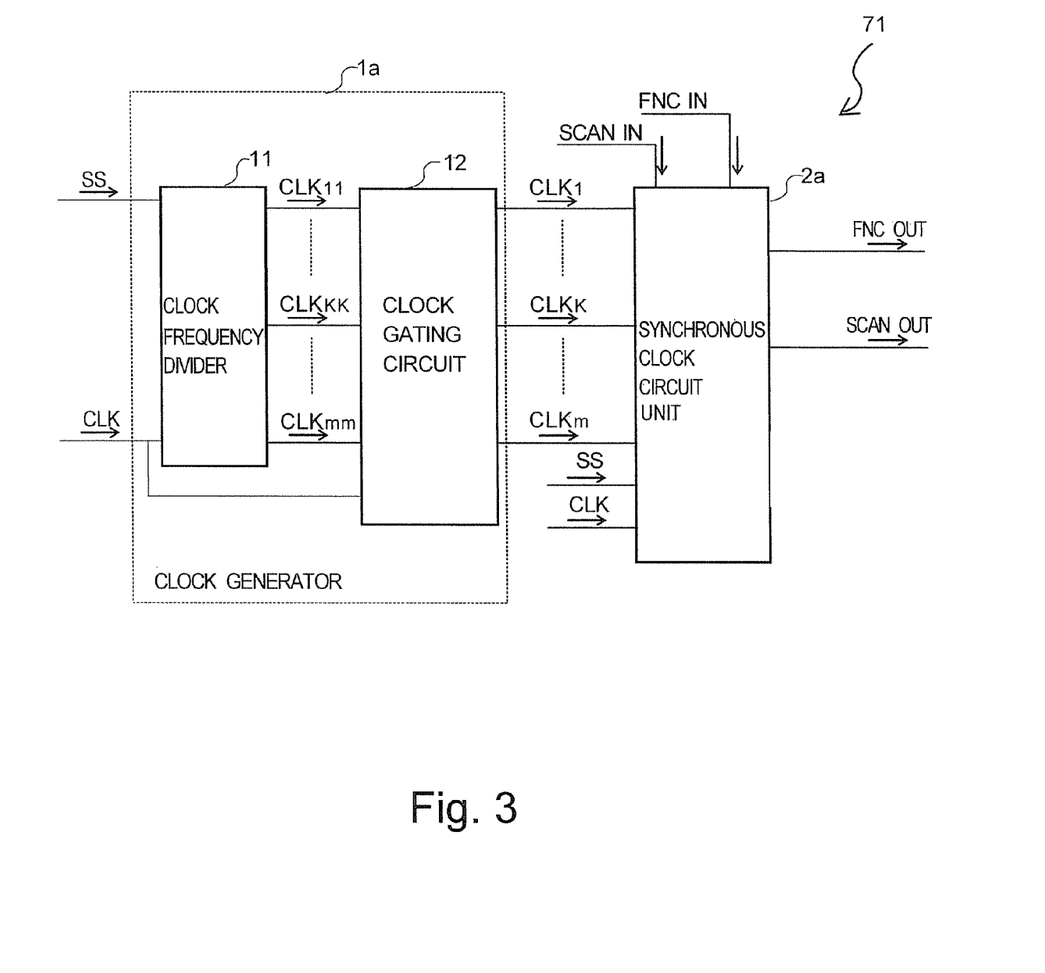
FIG. 3 is a block diagram showing an integrated circuit serving as a system LSI according to a second embodiment of the present invention.
Figure 4A:
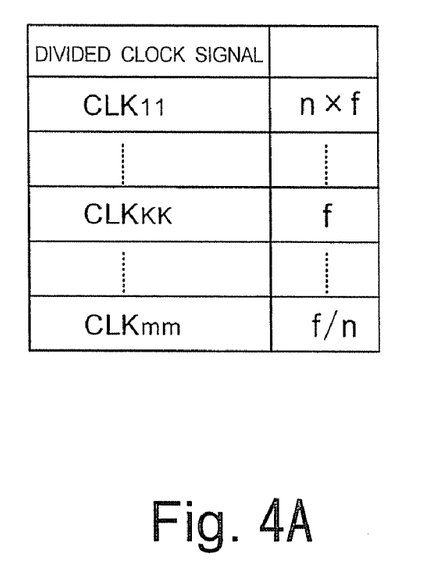
FIGS. 4A and 4B are charts for explaining clock signals outputted from a clock frequency divider and a clock gating circuit according to the second embodiment of the present invention.
Figure 4B:
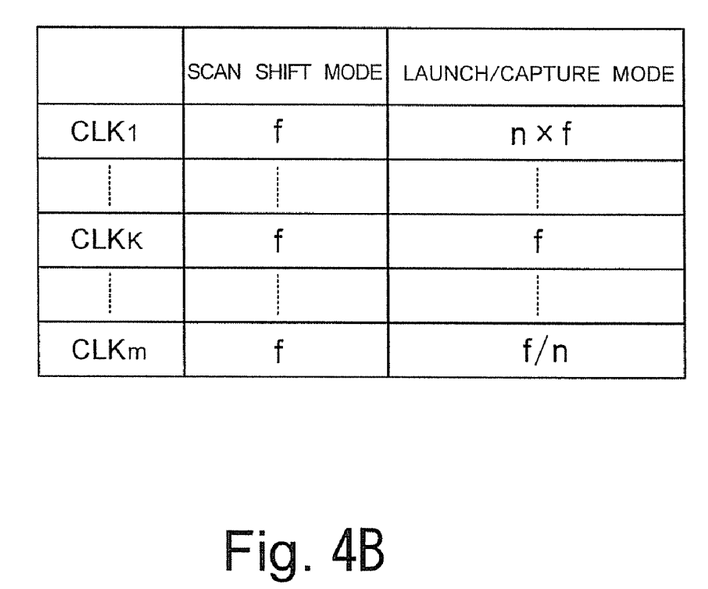

Next, an integrated circuit according to a second embodiment of the present invention will be described with reference to the accompanying drawings. FIG. 3 is a block diagram showing an integrated circuit serving as a system LSI. FIGS. 4A and 4B are charts for explaining clock signals outputted from a clock frequency divider and a clock gating circuit, in which FIG. 4A is the chart for explaining the clock signals outputted from the clock frequency divider, and FIG. 4B is the chart for explaining the clock signals outputted from the clock gating circuit. In this embodiment, a clock generator includes the clock frequency divider and the clock gating circuit.

As shown in FIG. 3, an integrated circuit 71 includes a clock generator 1a and a synchronous clock circuit unit 2a.

The integrated circuit 71 is a scan-based integrated circuit. The clock generator 1a includes a clock frequency divider 11 and a clock gating circuit 12.

A clock signal CLK serving as a reference clock signal and a scan shift signal SS are inputted to the clock frequency divider 11. The clock frequency divider 11 generates m pieces of divided clock signals CLK11 . . . , CLKkk, . . . , and CLKmm.

The clock gating circuit 12 is located between the clock frequency divider 11 and the synchronous clock circuit unit 2a. The clock signals CLK, CLK11, . . . , CLKkk, . . . , and CLKmm are inputted to the clock gating circuit 12. The clock gating circuit 12 generates m pieces of clock signals CLK1, . . . , CLKk, . . . , and CLKm based on the clock signal CLK. The clock signals CLK1, . . . , CLKk, . . . , and CLKm are synchronous clock signals which are synchronized with one another.

The clock signals CLK1, . . . , CLKk, . . . , and CLKm outputted from the clock generator 1a, the clock signal CLK, the scan shift signal SS, a scan input signal Scan In, and a function input signal FNC In are inputted to the synchronous clock circuit unit 2a.

The synchronous clock circuit unit 2a performs a logic operation and outputs a function output signal FNC Out in a normal operation. The synchronous clock circuit unit 2a outputs a result of a scan test as a scan output signal Scan Out at the time of a scan test.

As shown in FIG. 4A, assuming that a frequency of the clock signal CLK having a duty ratio of 50% to 50% is set to (f), for example, a frequency of the clock signal CLK11 outputted from the clock frequency divider 11 is set to (n×f), a frequency of the clock signal CLKkk is set to (f) and a frequency of the clock signal CLKmm is set to (f/n). The clock signals CLK11, . . . , CLKkk, . . . , and CLKmm are synchronized with one other by use of rising edges of the respective signals and are adjusted to the signals each having the duty ratio of 50% to 50%, for example. Here, the value n is equal to or greater than 1 which may also be a non-integer. The clock signals CLK11, . . . , CLKkk, . . . , and CLKmm are the divided clock signals having mutually different frequencies.

As shown in FIG. 4B, the clock signals CLK1, . . . , CLKk, . . . , and CLKm outputted from the clock gating circuit 12 have the frequency (f) in the "scan shift mode". Here, the clock signals CLK1, . . . , CLKk, . . . , and CLKm are synchronized with one another by use of the rising edges thereof. Moreover, in the "launch and capture mode", the clock signal CLK1 has the frequency of (n×f), the clock signal CLKk has the frequency of (f), and the clock signal CLKm has the frequency of (f/n). These signals are synchronized with one another by use of the rising edges thereof, for example. Alternatively, these signals may be synchronized with one another by use of the falling edges thereof.

The synchronous clock circuit unit 2a starts setting up a phase relationship of the clock signals CLK1, . . . , CLKk, . . . , and CLKm just after the "scan shift mode" is transferred to the "launch and capture mode" while maintaining all states of scan nodes and retaining the SFF state, for example. Accordingly, it is possible to start the phase relationship of the clock signals CLK1, . . . , CLKK, . . . , and CLKm in a definitive state.

As described above, the integrated circuit of this embodiment includes the clock generator 1a and the synchronous clock circuit unit 2a. The clock signal CLK and the scan shift signal SS are inputted to the clock generator 1a, and the clock generator 1a generates the clock signals CLK1, . . . , CLKk, . . . , and CLKm which are synchronized with one another. In the "scan shift mode", the clock signals CLK1, . . . , CLKk, . . . , and CLKm are respectively provided with the clock frequency (f), synchronized with one another, and provided with the waveforms in the same phase. In the "launch and capture mode", the clock signal CLK1 has the clock frequency (n×f), the clock signal CLKk has the clock frequency (f), and the clock signal CLKm has the clock frequency (f/n), for example. The clock signals CLK1, . . . , CLKK, . . . , and CLKm in the "launch and capture mode" are synchronized with one another.

Accordingly, it is possible to start the phase relationship of the clock signals CLK1, . . . , CLKK, . . . , and CLKm in the definitive state just after the scan shift mode is transferred to the "launch and capture mode" while maintaining all the states of scan nodes and retaining states of synchronous clock circuits in the synchronous clock circuit unit 2a. Therefore, it is possible to avoid occurrence of a skew among the clock signals CLK1, . . . , CLKk, . . . , and CLKm outputted from the clock generator 1a.

In this embodiment, the duty ratio of the clock signal. CLK is set to 50% to 50%. However, the duty ratio may be arbitrarily changed without limitation to the foregoing.

Figure 5:
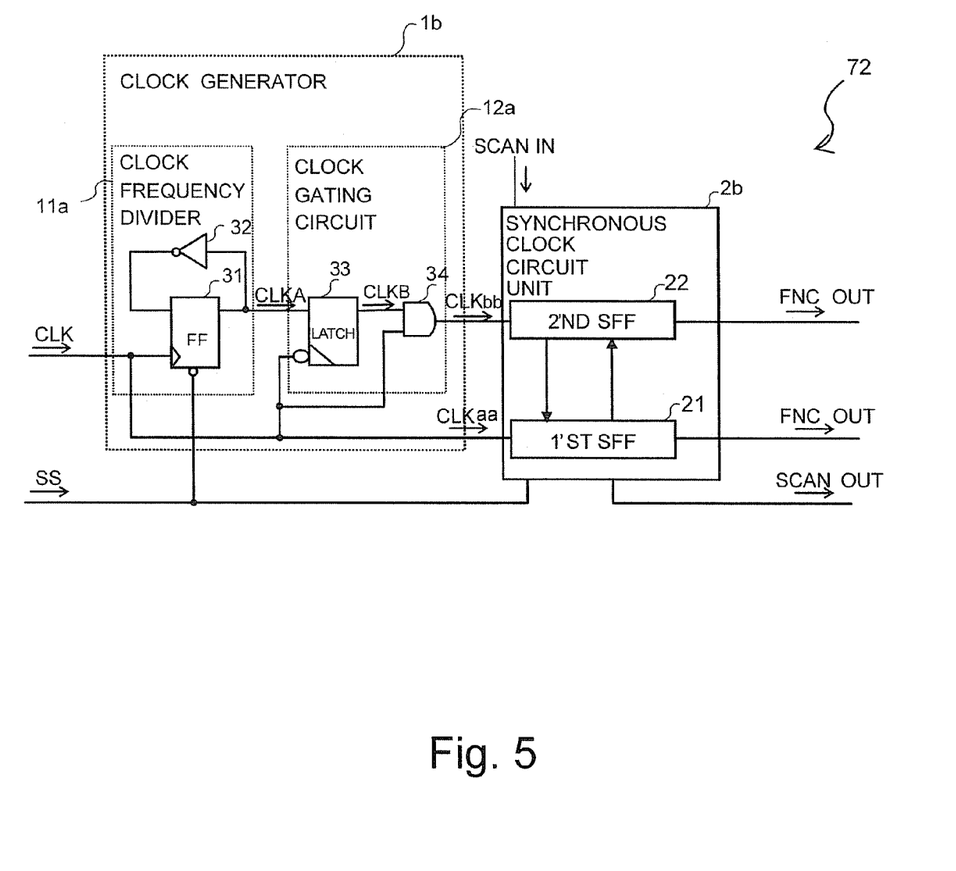
FIG. 5 is a block diagram showing an integrated circuit serving as a system LSI according to a third embodiment of the present invention.

Next, an integrated circuit according to a third embodiment of the present invention will be described with reference to the accompanying drawing. FIG. 5 is a block diagram showing an integrated circuit serving as a system LSI. In this embodiment, two clock signals outputted from a clock generator are synchronized with each other by use of rising edges thereof.

As shown in FIG. 5, an integrated circuit 72 includes a clock generator 1b and a synchronous clock circuit unit 2b. The integrated circuit 72 is a scan-based integrated circuit. The clock generator 1b includes a clock frequency divider 11a and a clock gating circuit 12a. A clock signal CLK serving as a reference clock signal and a scan shift signal SS are inputted to the clock generator 1b. The clock generator 1b generates a clock signal CLKaa and a clock signal CLKbb which are synchronized with each other. Here, the clock signal CLK is employed to the clock signal CLKaa.

The clock frequency divider 11a includes a flip-flop 31 and an inverter 32. The clock signal CLK which is generated inside the integrated circuit 72 or inputted from outside and the scan shift signal SS are inputted to the flip-flop 31. In the flip-flop 31, a signal on an output side is inverted by the inverter 32 when the scan shift signal SS is set to a "low" level, for example, and the inverted signal is fed back thereto as a data signal. The flip-flop 31 outputs a divided clock signal CLKA having a frequency that is a half as high as the frequency of the clock signal CLK to the clock gating circuit 12a. If the scan shift signal SS is set to a "high" level, for example, the flip-flop 31 outputs a signal having a constant value instead of outputting the clock signal CLKA. Here, the clock signal CLKA is a divided clock signal.

The clock gating circuit 12a is located between the clock frequency divider 11a and the synchronous clock circuit unit 2b. The clock gating circuit 12a includes a latch circuit 33 and a two-input AND circuit 34. The latch circuit 33 is located between the flip-flop 31 and the two-input AND circuit 34. The clock signal CLK and the clock signal CLKA are inputted to the latch circuit 33. The latch circuit 33 latches the clock signal CLKA serving as the data signal at the time of rising of the clock signal CLK and outputs the signal as a clock signal CLKB.

The two-input AND circuit 34 is located between the latch circuit 33 and the synchronous clock circuit unit 2b. The clock signal CLKB and the clock signal CLK are inputted to the two-input AND circuit 34. The two-input AND circuit 34 outputs a signal obtained by logic operation to the synchronous clock circuit unit 2b as the clock signal CLKbb. Here, the two-input AND circuit 34 outputs a "high" level signal when both of the clock signal CLKB and the clock signal CLK are set to the "high" level, and outputs a "low" level signal in other cases. The clock signal CLKbb is a synchronous signal which is synchronized with the clock signal CLK.

A scan chain is formed in the synchronous clock circuit unit 2b by providing a first SFF unit 21 and a second SFF unit 22. The first SFF unit 21 is provided with a SFF which is operated at a rising edge of the clock signal CLKaa. An unillustrated function input signal is inputted to the first SFF unit 21 whereby the first SFF unit 21 outputs a function output signal FNC Out. The second SFF unit 22 is provided with a SFF which is operated at a rising edge of the clock signal CLKbb. An unillustrated function input signal is inputted to the second SFF unit 22 whereby the second SFF unit 22 outputs a function output signal FNC Out. The first SFF unit 21 and the second SFF unit 22 exchange signals with each other. At the time of the scan test, a scan input signal Scan In is inputted to the synchronous clock circuit unit 2b, and the synchronous clock circuit unit 2b outputs a result of the scan test as a scan output signal Scan Out.

Figure 6:
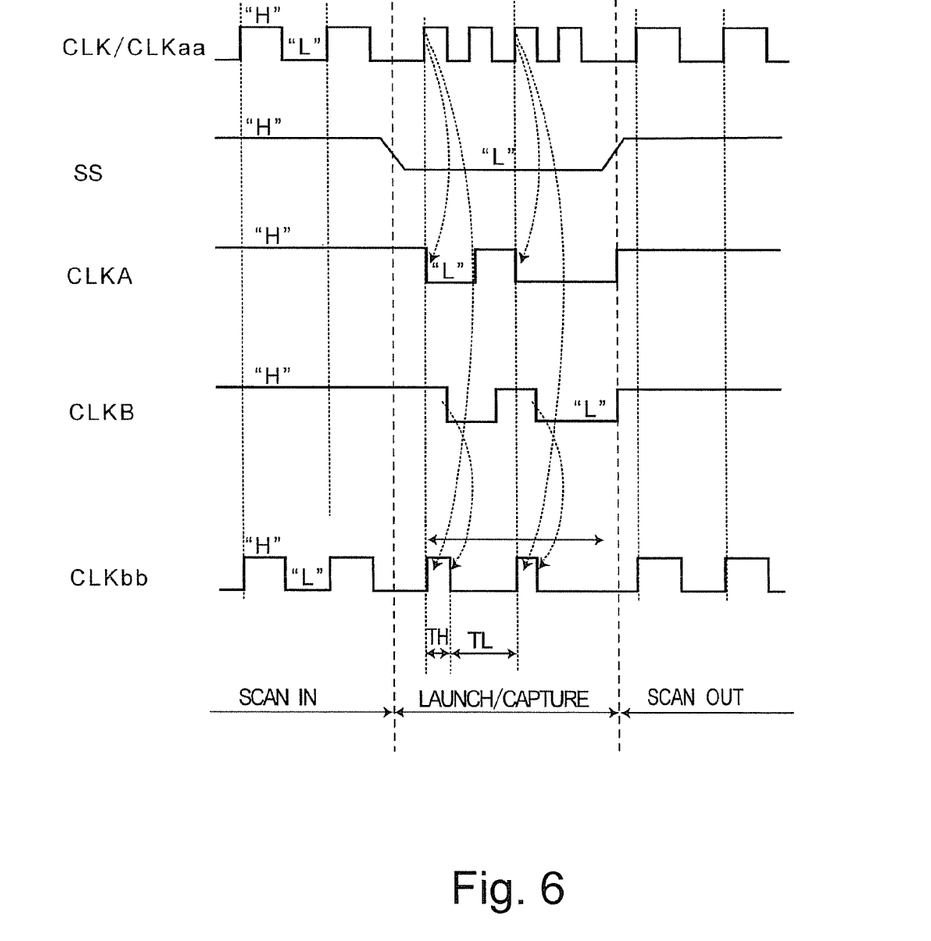
FIG. 6 is a timing chart showing operations of a clock generator according to the third embodiment of the present invention.
Figure 7:
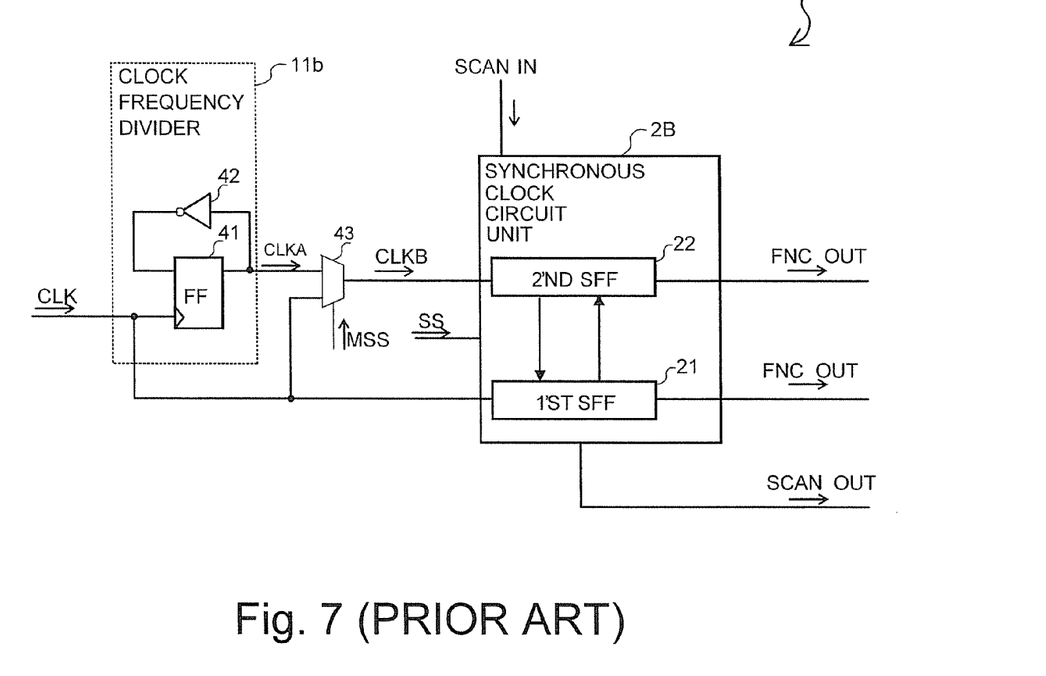
FIG. 7 is a block diagram showing a conventional integrated circuit.
Figure 8:
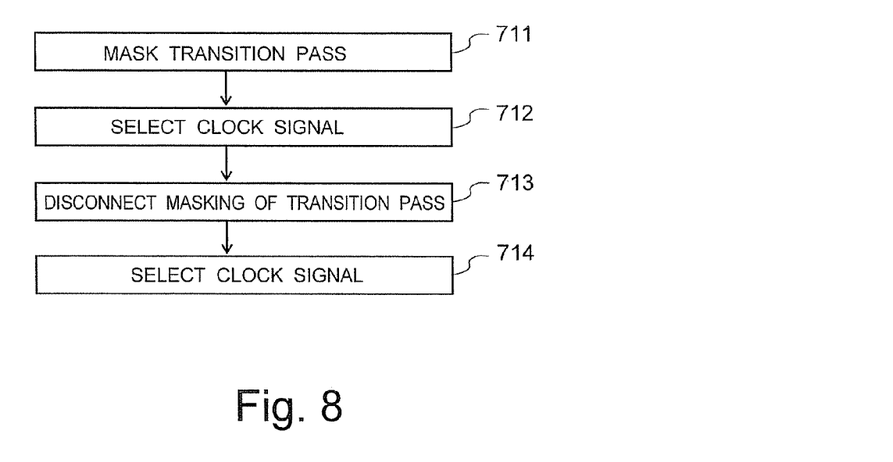
FIG. 8 is a flowchart showing execution of a delay test on the conventional integrated circuit in accordance with the third embodiment of the present invention.

Next, operations of the clock generator will be described with reference to the accompanying drawings. FIG. 6 is a timing chart showing operations of the clock generator. FIG. 7 is a block diagram showing a conventional integrated circuit. FIG. 8 is a flowchart showing execution of a delay test on the conventional integrated circuit. Here, the timing chart illustrates waveform variation of the clock signals necessary for carrying out a delay fault test of a SFF unit.

As shown in FIG. 6, when the scan shift signal SS is set to the "high" level in a "scan in" state, the clock signal CLKA outputted from the clock frequency divider 11a is set to the "high" level. Meanwhile, the clock signal CLKB outputted from the latch circuit 33 is set to the "high" level. Accordingly, the clock signal CLKaa and the clock signal CLKbb outputted from the clock gating circuit 12a are formed into the signals having the same frequency and the same phase which are synchronized with each other by use of the rising edges thereof. The clock signal CLKaa is inputted to the first SFF unit 21 while the clock signal CLKbb that is the signal having the same phase and being synchronized with the clock signal CLKaa is inputted to the second SFF unit 22.

Next, in the "launch and capture mode", the scan shift signal SS is changed to the "low" level whereby the clock frequency divider 11a starts a frequency dividing operation. When the clock signal CLK having the frequency, for example, twice as high as the frequency in the "scan in" state is inputted, the clock frequency divider 11a outputs the clock signal CLKA having the same frequency as the clock signal CLK in the "scan in" state. The latch circuit 33 outputs the clock signal CLKB which is delayed by a quarter of a cycle as compared to the clock signal CLKA. The clock signal CLK and the clock signal CLKB are inputted to the two-input AND circuit 34, and the two-input AND circuit 34 outputs the signal obtained by the logic operation as the clock signal CLKbb. The clock signal CLKbb has 25% of the "high" level period TH and 75% of the "low" level period TL (the duty ratio of 25% to 75%) and the same frequency as the frequencies of the clock signal CLKA and the clock signal CLKB. The clock gating circuit 12a is operated at a first rising edge of the clock signal CLK having the frequency twice as high as the signal in the "scan in" state and at a rising edge in a third cycle.

The clock signal CLKbb outputted from the clock gating circuit 12a is synchronized with the clock signal CLK having the frequency twice as high as the signal in the "scan in" state by use of the rising edges of the signals. The clock signal CLKbb has the same frequency as that of the clock signal CLK in the "scan in" state. This clock signal CLKbb is inputted to the second SFF unit 22. Accordingly, the second SFF unit 22 constituting the scan chain is subjected to the scan test at the first rising edge (the launch clock) of the clock signal CLKbb, and data are captured at a second rising edge (a capture clock) of the clock signal CLKbb.

Subsequently, when the scan shift signal SS is set to the "high" level in a "scan out" state, the clock signal CLKA outputted from the clock frequency divider 11a is set to the "high" level. Meanwhile, the clock signal CLKB outputted from the latch circuit 33 is set to the "high" level. Accordingly, the clock signal CLKbb and the clock signal CLKaa outputted from the clock gating circuit 12a are formed into the signals having the same frequency and the same phase which are synchronized with each other by use of the rising edges thereof. The data of the second SFF unit 22 subjected to the scan test in the "launch and capture mode" are inputted to the SFF in the first SFF unit 21 constituting the scan chain and are subjected to the scan test at the rising edge of the clock signal CLKaa. A signal representing a result of a delay test obtained by the scan test is outputted form the first SFF unit 21.

The first SFF unit 21 and the second SFF unit 22 constituting the scan chain are subjected to the scan test based on the clock signals CLKaa and the CLKbb which are synchronized with each other by use of the rising edges of the signals. Accordingly, it is possible to execute the delay tests for the SFF units accurately.

As shown in FIG. 7, a conventional integrated circuit 73 which is configured to execute a scan test by use of a multiplexer includes a clock frequency divider 11b, a synchronous clock circuit unit 2b, and a multiplexer 43. The synchronous clock circuit unit 2b herein has the same configuration as the synchronous clock circuit unit 2b of this embodiment, and description thereof will therefore be omitted.

The clock frequency divider 11b includes a flip-flop 41 and an inverter 42. The clock signal CLK which is generated inside the integrated circuit 73 or inputted from outside is inputted to the flip-flop 41. The signal on the output side is inverted by the inverter 42, and the inverted signal is fed back thereto as the data signal. The flip-flop 41 outputs the divided clock signal CLKA having the frequency that is a half as high as the frequency of the clock signal CLK to the multiplexer 43.

The multiplexer 43 is located between the flip-flop 41 and the synchronous clock circuit unit 2b, and the clock signal CLKA and the clock signal CLK are inputted thereto. The multiplexer 43 selects either the clock signal CLKA or the clock signal CLK based on a multiplexer control signal MSS and outputs the selected signal to the second SFF unit 22 as the clock signal CLKB.

As shown in FIG. 8, in the delay test on the conventional integrated circuit 73, the clock signal CLK is selected in the scan test as the clock signal CLKB to be outputted from the multiplexer 43. The second SFF unit 22 constituting the scan chain is a boundary—scan pass that is operated by the divided clock signal CLKA having the frequency a half as high as the frequency of the clock signal CLK. In order to mask an expected value, a transition pass from the SFF to the next SFF is masked (a first step 711), Next, the divided clock signal CLKA is selected as the clock signal CLKB to be outputted from the multiplexer 43 (a second step 712).

Subsequently, the masking of the transition pass from the SFF to the next SFF is disconnected in order to execute the scan test on the second SFF unit 22. The divided clock signal CLKA is inputted to the SFF in the second SFF 22 unit constituting the scan chain whereby the second SFF unit 22 is subjected to the scan test at the rising edge of the divided clock signal CLKA (a third step 713).

After reducing the frequency of the clock signal CLK to half, the clock signal CLK having the frequency a half as high as the frequency of the precedent clock signal CLK is selected as the clock signal CLKB to be outputted from the multiplexer 43. The data on the second SFF unit 22 as well as the clock signal CLK having the frequency a half as high as the frequency of the precedent clock signal CLK are inputted to the first SFF unit 21 constituting the scan chain whereby the first SFF unit 21 is subjected to the scan test at the rising edge of the clock signal CLK having the frequency a half as high as the frequency of the precedent clock signal CLK. A result of the delay test subjected to the scan test is outputted from the first SFF unit 21 (a fourth step 714).

The number of steps needed for executing the scan test in this embodiment is only one for the procedure of pattern generation whereas the delay test on the conventional integrated circuit requires the four steps. Moreover, since the multiplexer is inserted to a clock line, it is difficult to achieve timing adjustment attributed to a skew between the clock signal CLK and the clock signal CLKA.

As described above, the integrated circuit of this embodiment includes the clock generator 1b and the synchronous clock circuit unit 2b. The clock generator 1b includes the clock frequency divider 11a and the clock gating circuit 12a. The clock frequency divider 11a includes the flip-flop 31 and the inverter 32. When the scan shift signal SS is set to the "low" level, the flip-flop 31 outputs the divided clock signal CLKA having the frequency a half as high as the frequency of the clock signal CLK. When the scan shift signal SS is set to the "high" level, the flip-flop 31 outputs the signal having the constant value. The clock gating circuit 12a includes the latch circuit 33 and the two-input AND circuit 34. When the scan shift signal SS is set to the "low" level, the clock gating circuit 12a generates the clock signal CLKbb based on the clock signal CLK, which has the frequency a half as high as the frequency of the clock signal CLK and the rising edge synchronized with the rising edge of the clock signal CLK. When the scan shift signal SS is set to the "high" level, the clock gating circuit 12a selects the clock signal CLK and outputs the selected signal as the clock signal CLKbb. The synchronous clock circuit unit 2b includes the first SFF unit 21 and the second SFF unit 22 collectively constituting the scan chain.

Accordingly, when the scan shift signal SS is set to the "low" level in the clock gating circuit 12a, the clock signal CLKA divided by the clock frequency divider 11a becomes the clock signal CLKbb based on the clock signal CLK so as to have the frequency a half as high as the frequency of the clock signal CLK and to have the rising edge synchronized with the rising edge of the clock signal CLK. As a consequence, the divided clock signal and the clock signal before division are recognized by scan pattern software as the same type of clocks. Meanwhile, the divided clock signals have the same waveforms at the time of application of the launch and capture clock so that the clock signal CLK is defined as the clock and the scan pattern can be generated in a lump. Therefore, it is possible to complete the procedure of scan pattern generation in one step. Moreover, since it is not necessary to insert the conventionally used multiplexer to the clock line, it is possible to avoid occurrence of a difficulty of timing adjustment attributed to a skew between the clock signal and the divided clock signal.

In this embodiment, the second SFF unit 22 is subjected to the scan test in the first place and then the first SFF unit 21 is subjected to the scan test. However, it is possible to subject the first SFF unit 21 to the scan test in the first place and then to subject the second SFF unit 22 to the scan test by means of changing the scan pass, so that the result of the delay test may be outputted from the second SFF unit 22. Meanwhile, the clock signal CLK is employed to the clock signal CLKaa to be inputted to the synchronous clock circuit unit 2b. Instead, it is possible to provide the clock generator 1b with the clock frequency divider and the clock gating circuit for dividing the frequency in half additionally and to generate the clock signal CLKaa which is different from the clock signal CLK. In this case, a circuit scale of the clock generator is increased. However, it is not necessary to change the frequency of the clock signal CLK in the "launch and capture mode".

Figure 9:
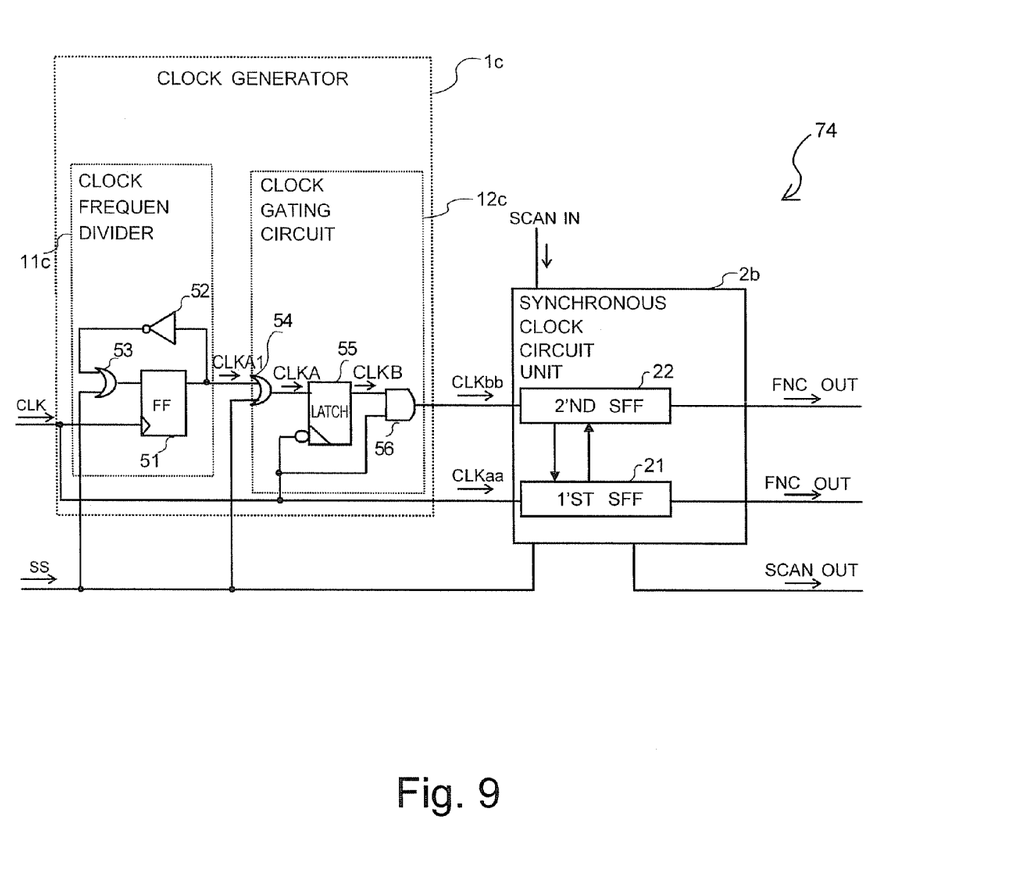
FIG. 9 is a block diagram showing an integrated circuit serving as a system LSI according to a fourth embodiment of the present invention.

Next, an integrated circuit according to a fourth embodiment of the present invention will be described with reference to the accompanying drawing. FIG. 9 is a block diagram showing an integrated circuit serving as a system LSI. In this embodiment, the clock signal to be inputted to the clock frequency divider and the divided clock signal to be outputted from the clock gating circuit are synchronized with each other by use of the rising edges thereof.

In the following, the same constituents as those in the third embodiment are designated by the same reference numerals and description thereof will be omitted. The following description will be focused on different features.

As shown in FIG. 9, an integrated circuit 74 includes a clock generator 1c and the synchronous clock circuit unit 2b. The integrated circuit 74 is a scan-based integrated circuit. The clock generator 1c includes a clock frequency divider 11c and a clock gating circuit 12c. The clock signal CLK serving as the reference clock signal and the scan shift signal SS are inputted to the clock generator 1c. The clock generator 1c outputs the clock signals CLKaa and CLKbb which are synchronized with each other. Here, the clock signal CLK is employed to the clock signal CLKaa.

The clock frequency divider 11c includes a flip-flop 51, an inverter 52, and a two-input OR circuit 53. The clock signal CLK which is generated inside the integrated circuit 74 or inputted from outside is inputted to the flip-flop 51. The signal outputted from the flip-flop 51 is inverted by the inverter 52, and the inverted signal is inputted to an input side of the two-input OR circuit 53. This inverted signal and the scan shift signal SS are inputted to the two-input OR circuit 53, and a signal obtained by a logic operation is outputted to the flip-flop 51 (a data port). The two-input OR circuit 53 outputs a "low" level signal when both of the inverted signal outputted from the inverter 52 and the scan shift signal SS are set to the "low" level and outputs a "high" level signal in other cases.

Here, when the scan shift signal SS is set to the "low" level, for example, the clock frequency divider 11c outputs the divided clock signal having the frequency a half as high as the frequency of the clock signal CLK. When the scan shift signal SS is set to the "high" level, for example, the clock frequency divider 11c outputs a signal having a constant value instead of outputting the signal having the frequency a half as high as the frequency of the clock signal CLK.

The clock gating circuit 12c is located between the clock frequency divider 11c and the synchronous clock circuit unit 2b. The clock gating circuit 12c includes a two-input OR circuit 54, a latch circuit 55 and a two-input AND circuit 56.

The two-input OR circuit 54 is located between the flip-flop 51 and the latch circuit 55. A clock signal CLKA1 outputted from the flip-flop 51 and the scan shift signal SS are inputted to the two-input OR circuit 54, and a signal obtained by a logic operation is outputted to the latch circuit 55 as the clock signal CLKA. The clock signal CLKA1 is a divided clock signal.

Here, the clock signal CLKA to be outputted from the two-input OR circuit 54 becomes a divided clock signal when the scan shift signal SS is set to the "low" level or becomes a signal having a constant value when the scan shift signal SS is set to the "high" level.

Note that the clock signal CLKbb to be outputted from the clock gating circuit 12c has a similar waveform as shown in FIG. 6 (the third embodiment) and description thereof will be omitted.

As described above, the integrated circuit of this embodiment includes the clock generator 1c and the synchronous clock circuit unit 2b. The clock generator 1c includes the clock frequency divider 11c and the clock gating circuit 12c. The clock frequency divider 11c includes the flip-flop 51, the inverter 52, and the two-input OR circuit 53. When the scan shift signal SS is set to the "low" level, the flip-flop 51 outputs the divided clock signal CLKA having the frequency a half as high as the frequency of the clock signal CLK. When the scan shift signal SS is set to the "high" level, the flip-flop 51 outputs the signal having the constant value. The clock gating circuit 12c includes the two-input OR circuit 54, the latch circuit 55 and the two-input AND circuit 56. When the scan shift signal SS is set to the "low" level, the clock gating circuit 12c generates the clock signal CLKbb based on the clock signal CLK, which has the frequency a half as high as the frequency of the clock signal CLK and the rising edge synchronized with the rising edge of the clock signal CLK. When the scan shift signal SS is set to the "high" level, the clock gating circuit 12c selects the clock signal CLK and outputs the selected signal as the clock signal CLKbb. The synchronous clock circuit unit 2b includes the first SFF unit 21 and the second SFF unit 22 collectively constituting the scan chain.

Accordingly, when the scan shift signal SS is set to the "low" level in the clock gating circuit 12c, the clock signal CLKA1 divided by the clock frequency divider 11c becomes the clock signal CLKbb based on the clock signal CLK so as to have the frequency a half as high as the frequency of the clock signal CLK and to have the rising edge synchronized with the rising edge of the clock signal CLK. Therefore, the divided clock signal and the clock signal before division are recognized by the scan pattern software as the same type of clocks. Meanwhile, the divided clock signals have the same waveforms at the time of application of the launch and capture clock so that the clock signal CLK is defined as the clock and the scan pattern can be generated in a lump. Therefore, it is possible to complete the procedure of scan pattern generation in one step. Moreover, since it is not necessary to insert the conventionally used multiplexer to the clock line, it is possible to avoid occurrence of a difficulty of timing adjustment attributed to a skew between the clock signal and the divided clock signal.

The present invention will not be limited only to the above-described embodiments, but various other modifications are possible without departing from the spirit and scope of the invention.

For example, the invention has been applied to a system LSI in the above-described embodiments. However, the invention is also applicable to a SoC (system on a chip) configured to load a memory, a logic circuit, and an analog circuit on a single chip, for example. Moreover, the invention is configured to use the synchronous clock signals outputted from the clock generator as the scan test signals. However, it is also possible to use the synchronous clock signals as clock signals for logic circuits for a purpose other than the scan test.

What is claimed is:

1. A scan-based integrated circuit, comprising:
a clock generator to generate a plurality of clock signals by use of a reference clock signal; and
a synchronous clock circuit unit including a plurality of synchronous clock circuits constituting a scan chain to be scanned by the clock signals,
wherein the clock signals are used for both a scan shift mode and a launch and capture mode, a phase relationship of the clock signals is set up by use of the reference clock signal just after the scan shift mode is transferred to the launch and capture mode by a scan shift signal while maintaining states of scan nodes of the synchronous clock circuits, so that the clock signals are synchronizes with one another in the scan shift mode and the launch and capture mode.

2. The scan-based integrated circuit according to claim 1, wherein the clock generator generates a plurality of clock signals having different frequencies in the launch and capture mode.

3. The scan-based integrated circuit according to claim 1, wherein the clock signals are synchronized with one another by use of a first rising edge or a first falling edge just after the scan shift mode is transferred to the launch and capture mode.

4. A scan-based integrated circuit, comprising:
a clock generator including a clock frequency divider to generate a plurality of divided clock signals having different frequencies by use of a reference clock signal, the clock generator further including a clock gating circuit to generate a plurality of clock signals by use of the divided clock signals and the reference clock signal; and
a synchronous clock circuit unit including a plurality of synchronous clock circuits constituting a scan chain to be scanned by the clock signals,
wherein the clock signals are used for both a scan shift mode and a launch and capture mode, a phase relationship of the clock signals is set up by use of the reference clock signal just after the scan shift mode is transferred to the launch and capture mode by a scan shift signal while maintaining states of scan nodes of the synchronous clock circuits, so that the clock signals are synchronizes with one another in the scan shift mode and the launch and capture mode.

5. The scan-based integrated circuit according to claim 4, wherein the clock generator generates a plurality of synchronous clock signals having different frequencies in the launch and capture mode.

6. The scan-based integrated circuit according to claim 4, wherein the clock signals are synchronized with a first rising edge or a first falling edge of the reference clock signal.

7. The scan-based integrated circuit according to claim 4, wherein the synchronous clock circuit unit has a SFF receiving anyone of the clock signals.

8. The scan-based integrated circuit according to claim 4, wherein the clock gating circuit has a latch circuit and a two-input AND circuit, the latch circuit latches one of the divided clock signals at a rising edge of the reference clock signal as a data signal, and the two-input AND circuit generates one of the clock signals based on of an output signal of the latch circuit and the reference clock signal.

9. A scan-based integrated circuit, comprising:
a clock generator including a clock frequency divider to generate a divided clock signal divided a frequency of a reference clock signal into a value of n divided by m, the clock generator further including a clock gating circuit to generate a clock signal by use of the divided clock signal and the reference clock signal; and a synchronous clock circuit unit including a plurality of synchronous clock circuits constituting a scan chain to be scanned by the reference clock signal and the clock signal, wherein the clock signals are used for both a scan shift mode and a launch and capture mode, n and m are positive integers, a value of n is larger than a value of m, a phase relationship of the clock signal is set up by use of the reference clock signal just after the scan shift mode is transferred to the launch and capture mode by a scan shift signal while maintaining states of scan nodes of the synchronous clock circuits, so that the reference clock signal and the clock signal are synchronizes with one another in the scan shift mode and the launch and capture mode.

10. The scan-based integrated circuit according to claim 9, wherein the clock signal is synchronized with a first rising edge or a first falling edge of the reference clock signal.

11. The scan-based integrated circuit according to claim 9, wherein the synchronous clock circuit unit receives a plurality of clock signals, and has a SFF receiving anyone of the clock signals.

12. The scan-based integrated circuit according to claim 9, wherein the clock gating circuit has a latch circuit and a two-input AND circuit, the latch circuit latches the divided clock signal at a rising edge of the reference clock signal as a data signal, and the two-input AND circuit generates the clock signal by use of an output signal of the latch circuit and the reference clock signal.

13. The scan-based integrated circuit according to claim 9, wherein the synchronous clock circuit unit receives a first clock of the clock signal as a first launch clock just after the scan shift mode is transferred to the launch and capture mode, and receives a last clock of the clock signal as a last capture clock just before the launch and capture mode is transferred to the scan shift mode.

14. A scan-based integrated circuit, comprising:

a clock generator including a clock frequency divider to generate a plurality of divided clock signals having different frequencies by use of a reference clock signal and a scan shift signal, the clock generator further including a clock gating circuit to generate a plurality of clock signals by use of the divided clock signals, the reference clock signal and the scan shift signal; and a synchronous clock circuit unit including a plurality of synchronous clock circuits constituting a scan chain to be scanned by the reference clock signal and the clock signals, wherein the clock signals are used for both a scan shift and a launch and capture mode, a phase relationship of the clock signals is set up by use of the reference clock signal just after the scan shift mode is transferred to the launch and capture mode by a scan shift signal while maintaining states of scan nodes of the synchronous clock circuits, so that the clock signals are synchronizes with one another in the scan shift mode and the launch and capture mode.

* * * * *